United States Patent [19]
Chuprun et al.

[11] Patent Number: 6,115,580
[45] Date of Patent: Sep. 5, 2000

[54] COMMUNICATIONS NETWORK HAVING ADAPTIVE NETWORK LINK OPTIMIZATION USING WIRELESS TERRAIN AWARENESS AND METHOD FOR USE THEREIN

[75] Inventors: Jeffrey Scott Chuprun, Scottsdale; Chad S. Bergstrom; Byron Tarver, both of Chandler; Bennett Beaudry, Scottsdale, all of Ariz.

[73] Assignee: Motorola, Inc., Schaumburg, Ill.

[21] Appl. No.: 09/150,196

[22] Filed: Sep. 8, 1998

[51] Int. Cl.[7] ........................................................ H04K 3/00
[52] U.S. Cl. .................................... 455/1; 455/1; 455/525
[58] Field of Search ..................................... 455/456, 445, 455/446, 449, 435, 525, 1, 62, 67.1, 67.7; 340/825.02

[56] References Cited

U.S. PATENT DOCUMENTS

| | | | |
|---|---|---|---|
| 4,912,656 | 3/1990 | Cain et al. | 364/514 |
| 4,999,833 | 3/1991 | Lee | 370/94.1 |
| 5,452,294 | 9/1995 | Natarajan | 370/54 |
| 5,457,810 | 10/1995 | Ivanov et al. | 455/33.2 |
| 5,710,805 | 1/1998 | Armbruster et al. | 455/435 |
| 5,794,128 | 8/1998 | Brockel et al. | 455/67.1 |
| 5,974,236 | 10/1999 | Sherman | 395/200.31 |
| 5,982,324 | 11/1999 | Watters et al. | 342/357.06 |
| 5,995,041 | 11/1999 | Bradley et al. | 342/42 |

FOREIGN PATENT DOCUMENTS

| | | | |
|---|---|---|---|
| 0372270 | 11/1989 | European Pat. Off. | H04Q 3/00 |
| 0481171 | 7/1991 | European Pat. Off. | H04L 12/56 |

OTHER PUBLICATIONS

Cordely; terrain modelling and ground cover data for propagation studies; IEE Colloquium, 1993.

Buhler et al.; Estimation of heavy time dispersion of mobile radio channels using a path tracing concept, May 1993.

Aboulgasem et al.; Computer aided design of special purpose systems, May 1989.

*Primary Examiner*—Curtis A. Kuntz
*Assistant Examiner*—Melur Ramakrishnaiah
*Attorney, Agent, or Firm*—John C. Scott; Timothy J. Lorenz; Frank J. Bogacz

[57] ABSTRACT

A communications network (10) having a plurality of wireless nodes (12–28) distributed within a region of interest makes routing decisions based on terrain information for the region of interest. A link quality determination unit (54) determines the quality of individual node-to-node links within the network (10), based on the location of the nodes (12–28) and the terrain about the nodes (12–28). A path selection unit 58 then determines an optimal path through the network 10 based on the link quality information. In one embodiment, communications corridors (102) are defined as preferred subpaths within a network for use in connecting remote nodes.

41 Claims, 4 Drawing Sheets

COMMUNICATIONS NETWORK HAVING ADAPTIVE NETWORK LINK OPTIMIZATION USING WIRELESS TERRAIN AWARENESS AND METHOD FOR USE THEREIN

FIELD OF THE INVENTION

The invention relates in general to communications networks and, more particularly, to signal routing in wireless communications networks.

BACKGROUND OF THE INVENTION

A wireless communications network generally comprises a plurality of wireless communications nodes that are distributed geographically within a region. The nodes communicate with one another through wireless links between the nodes. Control in a wireless communications network can be either centralized or distributed through the network. In a centralized network, control is maintained within one or more centralized base station nodes in the network. Each of the base station nodes is within range of some or all of the wireless nodes in the network. All communications between nodes in the centralized network take place through at least one of the base station nodes. The base station nodes also determine how the message will be routed from a source node to a destination node.

In a distributed network, there is no centralized control in the network. That is, connections between nodes in the network are set up by the individual nodes without the intervention of a base station. If two nodes are not within communications range of one another, a connection is established between the nodes using a series of node-to-node links. Routing decisions are made within the individual nodes. Networks following this approach are sometimes referred to as "ad-hoc" networks. In general, ad-hoc networks are not constrained to using predefined links to provide a connection between two nodes. Instead, such networks can establish a connection between nodes by using any combination of available node-to-node links to connect the desired nodes.

As can be appreciated, a connection between two nodes in a wireless communications network, whether centralized or distributed, is only as sound as the individual links that make up the connection. That is, if one of the links that is used to establish the connection is of poor quality, the overall connection will be of poor quality. For example, if one of the links is only capable of supporting a relatively low data rate, the entire connection is constrained by this data rate. In addition, if one of the links fails during a communication, the entire connection fails.

Therefore, there is a need for a method and apparatus that is capable of enhancing connectivity in a wireless communications network by intelligently selecting the wireless links that are used to establish connections between nodes in the network.

DETAILED DESCRIPTION OF THE DRAWINGS

The present invention relates to a system that is capable of determining an optimal path through a wireless communications network using terrain information for a region of interest. The system uses the terrain information and knowledge of network node locations to estimate the quality of node-to-node links in the network (e.g., by estimating path-loss between nodes). The link quality information is then used to determine an optimal connection path between two nodes. In one embodiment, the link quality information is used to establish communications corridors in the network which represent preferred communications subpaths for use in connecting nodes in the network. When a connection between nodes needs to be made, the system selects one or more of the communications corridors to provide the desired connection. The invention has application in both centralized and distributed communications networks. In addition, the invention can be used in systems that provide almost any type of information transfer, such as, for example, voice, data, and/or multimedia. In a preferred embodiment, the principles of the invention are used as a routing method within an ad-hoc communications network.

The present invention is capable of significantly improving connectivity and throughput in a wireless communications network. For example, the invention can improve the accuracy of routing decisions in wireless networks by improving the probability that a link or node can be reached successfully. In one embodiment, the invention provides power control in the wireless network for minimizing interference with other users of the network or with users of surrounding systems (or for reducing detectability by an enemy). In another embodiment, the invention is used to predict and optimize routing performance. Other benefits of the invention include rapid identification of alternate communications paths following a link failure, delay minimization, reduced power consumption, identification of multi-hop routing paths, and the avoidance of communications links plagued by interference or jamming sources.

Figure 1:
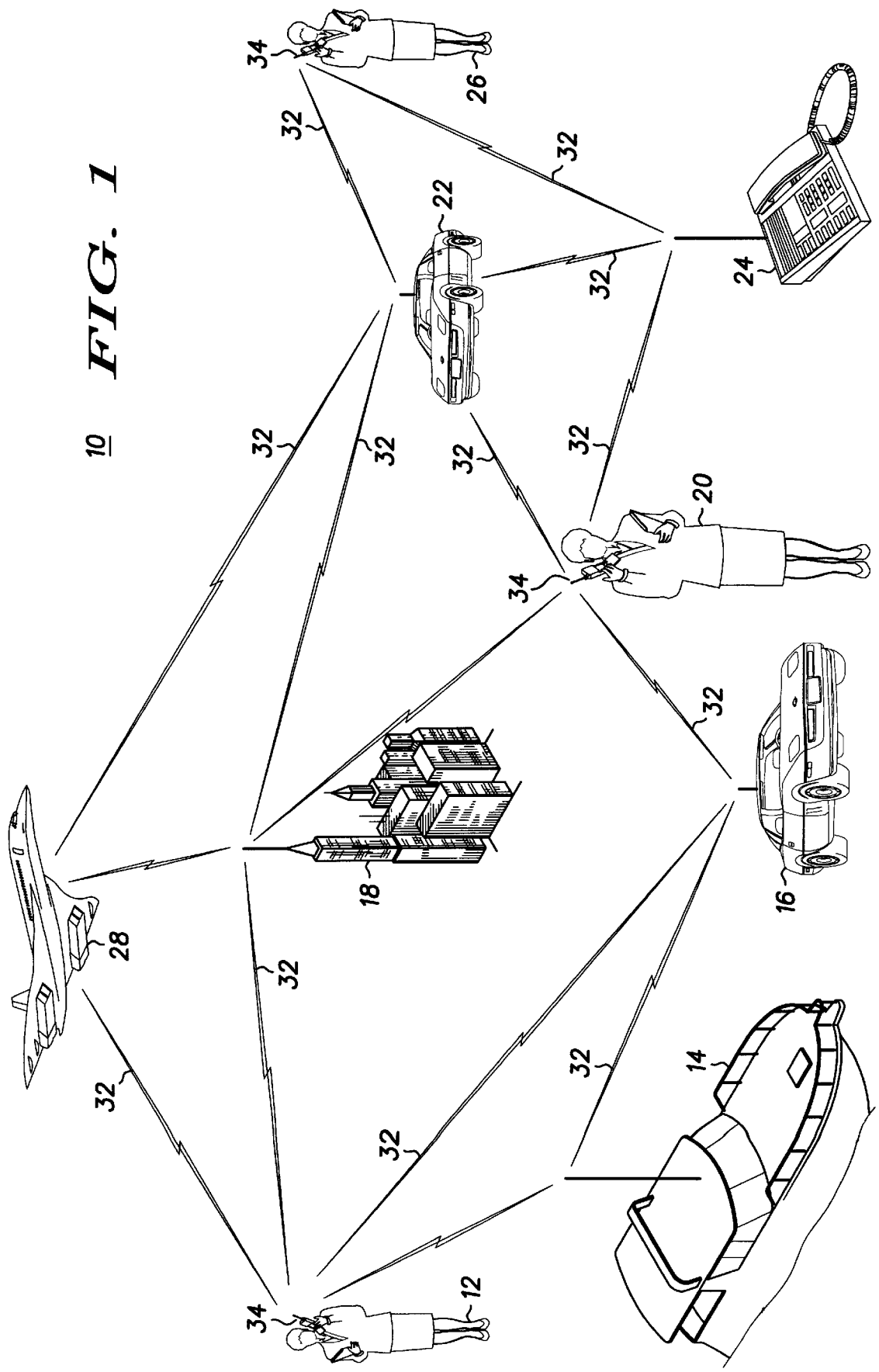
FIG. 1 is a diagram illustrating a communications network that can use the principles of the present invention.

FIG. 1 is a diagram illustrating a wireless communications network 10 which can benefit from the principles of the present invention. As illustrated, the network 10 includes a number of wireless nodes 12–28 that are each capable of communicating with other nodes in the network 10. The wireless nodes 12–28 can include, for example, stationary nodes, such as customer premises equipment (CPE) 24 and office building 18, and mobile nodes, such as pedestrians 12, 20, and 26, automobiles 16, and 22, boat 14, and aircraft 28. Each node includes a wireless transceiver unit for use in establishing direct wireless links 32 (such as line-of-sight (LOS) links) with one or more other nodes in the network 10. For example, pedestrian 20 can carry a handheld communicator 34 that allows him to establish a direct wireless link 32 to automobile 16. Likewise, automobile 16 can include a radio unit that allows it to establish a direct wireless link 32 to boat 14, and so on.

As illustrated, direct wireless links 32 do not exist between every possible node pair in the network 10. For example, pedestrian 20 is not able to establish a direct wireless link 32 with pedestrian 12, even though they both carry a transceiver. This might be because pedestrian 12 is too far away from pedestrian 20 (i.e., the handheld communicators 34 used by the pedestrians 12,20 are not powerful enough to span the range between them) or there may be an obstruction between the pedestrians 12,20 that blocks any signal propagating between them. To connect nodes that cannot support a direct wireless link 32 between them, multiple links 32 must be used to form a communication path between the nodes. As can be appreciated, there may be a wide variety of link combinations possible to provide any given inter-node connection. For example, automobile 22 can establish a connection to pedestrian 12 using any one of the following communications paths: (a) automobile 22 to aircraft 28 to pedestrian 12, (b) automobile 22 to building 18 to pedestrian 12, (c) automobile 22 to pedestrian 20 to automobile 16 to pedestrian 12, (d) automobile 22 to pedestrian 20 to building 18 to pedestrian 12, and (e) automobile 22 to pedestrian 20 to automobile 16 to boat 14 to pedestrian 12, to name but a few. In general, some of the available communications paths will be capable of providing higher quality communications than other paths. The quality of any particular communications path will depend on the quality of the individual links 32 making up the path. That is, if one or more of the links 32 in a chosen path is faulty, all communications through the path will be degraded.

In conceiving of the present invention, it was appreciated that the integrity of the individual communications links in a wireless communications network having mobile nodes depends heavily on the terrain in which the network is being implemented. That is, the quality of a communications link between two nodes depends to a large extent on the presence or absence of obstructions between the nodes. That is, any object or condition that interferes with a line-of-sight connection between two nodes will reduce the quality of communications between the nodes. As nodes move around within a region of interest, the number and magnitude of the obstructions between two nodes can vary significantly. Therefore, in accordance with the present invention, a system is provided that bases routing decisions in a network on knowledge of the terrain within which the network is operating. The system tracks the potential link quality of direct links in the network using knowledge of the terrain and bases routing decisions thereon. If the terrain information indicates that there is a particular obstruction between two nodes, the system evaluates the obstruction to determine its potential effect on direct communications between the two nodes. A quality value is then generated for use in rating the link between the two nodes. Routing decisions are then made based upon the quality values.

Figure 2:
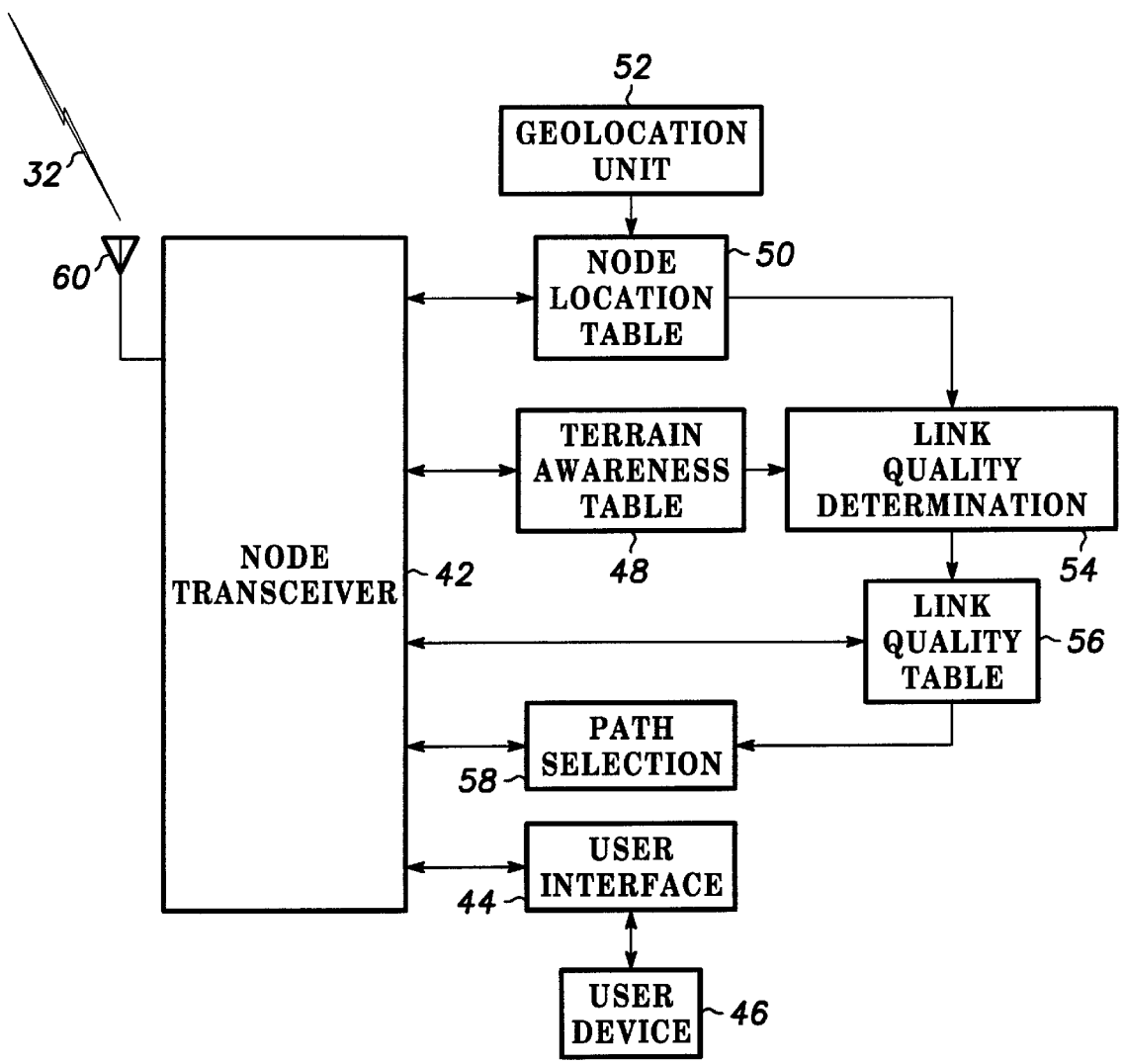
FIG. 2 is a block diagram of a wireless communications node in accordance with one embodiment of the present invention.

FIG. 2 is a block diagram illustrating a node 40 in accordance with one embodiment of the present invention. The node 40 can, for example, be any of the nodes 12–28 in the network 10 of FIG. 1. As illustrated, the node 40 includes: a node transceiver 42, a user interface 44, a user device 46, a terrain awareness table 48, a node location table 50, a geolocation unit 52, a link quality determination unit (LQDU) 54, a link quality table (LQT) 56, a path selection unit (PSU) 58, and an antenna 60. The node transceiver 42 communicates with other nodes in the network 10 via antenna 60. The node transceiver 42 also communicates with a user of the node 40 via user interface 44 and user device 46. In this manner, communications connections can be established between the user of node 40 and users at other nodes in the network 10. The node location table 50 and the terrain awareness table 48 are operative for storing, respectively, information about the location of the nodes in the network 10 and the terrain about the network 10. The LQDU 54 estimates the quality of the wireless links in the network 10 based on the node location and the terrain information. The LQT 56 stores the link quality information for the links in the system and the path selection unit 58 determines optimal paths between nodes in the network 10 based on the link quality information. The geolocation unit 52 is operative for determining the present location of the node 40.

The node transceiver 42 can include virtually any type of wireless transceiver device. The node transceiver 42 can be hardware based, software based, or a hybrid hardware/software unit can be used. In addition, the node transceiver 42 can include analog processing, digital processing, or a combination of the two. In one embodiment, the node receiver 42 includes reconfigurable processing units resources for supporting varying signal protocols and/or waveforms. The node receiver 42 can include a modem unit for performing modulation/demodulation on communications signals. In addition, the node transceiver 42 can include security functionality for performing, for example, data encryption/decryption functions. Such security features are especially useful in military applications. Other functionality typical to radio transceivers can also be provided.

The user interface 44 provides the interface between the node transceiver 44 and the user device 46. At a minimum, the user interface 44 performs all of the required signal format and protocol conversions between the units. The user device 46 can include virtually any type of data input/output device including, for example, a keyboard, a display, a stylus, a mouse, a speaker, a microphone, and/or others.

The node location table 50 stores the location of each of the wireless nodes in the network 10. The node location table 50 can include any type of data memory device capable of storing this information. The node location table 50 determines the location of the node 40 from the geolocation unit 52. The locations of the other nodes in the network 10 are received from the exterior environment, via node transceiver 42. In a preferred embodiment of the invention, each of the mobile nodes in the network 10 includes a geolocation unit 52 for use in determining its present location. The location information for each node is transmitted to all of the other nodes in the network 10 for storage in an associated node location table 50. The node location information in each node location table 50 is then periodically or continuously updated so that each node always has access to relatively recent node location information. The distribution of node location information throughout the network 10 can be performed in a network "flooding" operation during, for example, periods of inactivity. During a flooding operation, each node transmits a packet consisting of its geolocation which is passed on by subsequent nodes until the information has flooded the entire network 10. In another approach, an a priori "scan period" is used whereby all nodes transmit/scan for each other at the same time for geolocation computations based on time-difference of arrival. In yet another approach, the node positions would be known at a first instant in time, and updates would be based upon calculated velocity or an internal "mission plan" sequence. Node location information could also be distributed by a communications platform, such as a satellite, a tower, or an unmanned air vehicle (UAV).

The geolocation unit 52 can include virtually any type of device that is capable of determining a present location of an associated node. In a preferred embodiment, the geolocation unit 52 includes a global positioning system (GPS) receiver having a satellite antenna. Alternatively, the geolocation unit 52 can include: a device for deriving location information from an airborne vehicle (such as an airplane, a helicopter, a blimp, or a UAV), devices using dead-reckoning techniques, devices using time difference of arrival techniques, and others. In the preferred embodiment, location information is stored in latitude and longitude coordinates, but any form of location indicia is appropriate.

The terrain awareness table 48 is a memory unit for storing terrain information that describes the terrain within which the network 10 is operating. The terrain information includes at least elevation information for surface points within the region of operation. In a preferred embodiment, the terrain information includes digital terrain elevation data (DTED), such as that available via the MILSTAR satellite communications system. The DTED information includes detailed elevation data (with respect to sea level) for points throughout a region of interest, in a digitized format. DTED information is generally available from the MILSTAR system for regions across the globe. Access to the information, however, generally requires special satellite receiver equipment. In addition to elevation information, the terrain information can also include other types of information describing the terrain in the network region. For example, information describing man-made obstructions, such as buildings or bridges, can be included. In one embodiment, a region classification is provided for the region of interest. The region classification specifies the general type of terrain within which the network 10 is operating. For example, the region classification can specify one of the following terrain types: urban, desert, sea, jungle, forest, and mountain. Other terrain information types include information describing the soil type, foliage information, and/or climate information for the region of interest. The climate information will generally change based on the time of year.

In the illustrated embodiment, the terrain information is collected into the terrain awareness table 48 from exterior sources, via the node transceiver 42. For example, one node in the network 10 may include a MILSTAR transceiver for obtaining DTED information. Other nodes may have access to climate or foliage information, and so on. As with the node location information, the terrain information can be delivered to all of the nodes in the network 10 (via, for example, a flooding procedure). Periodic updates can also be performed if, for example, climatic conditions change or the network region of interest changes.

The LQDU 54, as described above, determines the quality of the node-to-node links in the network 10 using the node location information and the terrain information. In a preferred embodiment, the LQDU 54 estimates a pathloss between node pairs in the network 10 based on obstructions between the nodes. For example, knowing the locations of the two nodes to be connected and the terrain between the two locations (e.g., a hill or building), calculations can be performed to estimate an expected signal attenuation value between the nodes. Other factors, such as foliage density and expected humidity, can also be taken into account in the calculation. In one embodiment of the invention, a modified Longly-Rice algorithm is implemented to provide the desired pathloss figures using the terrain information. It should be appreciated that other (or alternative) link quality parameters can also be generated by the LQDU 54.

The LQT 56 is a memory unit for storing link quality information for links in the network 10. In one embodiment of the present invention, the LQT 56 will derive all of its link quality information from the LQDU 54. In another embodiment, some of the information in the LQT 56 will come from sources external to the node 40 (via, for example, a network flooding procedure). As with the other storage units, the LQT 56 will be subject to periodic or continuous updates, preferably during periods of reduced communications activity in the node 40.

The path selection unit (PSU) 58, as described above, selects the links that will be used to provide a connection between two nodes. In a preferred embodiment, the PSU 58 in each node of the network 10 is responsible for determining the communications path that will be used for all connections originating in that node. For example, if a user of the node 40 of FIG. 2 desires a connection to a remote node in the network 10, the PSU 58 within node 40 will determine the path (i.e., the combination of links) that will be used to connect to the remote node. The node transceiver 42 receives a connection request from the user (via user interface 44) and instructs the PSU 58 to determine the optimal path through the network 10. The PSU 58 then consults the LQT 56 and determines the optimal path. The path information is then delivered to the node transceiver 42 which does whatever is necessary (e.g., addressing the message) to implement the desired path.

The PSU 58 generally selects a path based on a desired goal for the connection. For example, if the path of least loss is desired, the PSU 58 will select the combination of links between the two nodes that provides the least estimated pathloss. If the goal is minimal delay, a combination of links will be selected that provides the least delay. Other possible goals can be highest throughput, least delay variation, and others. Of course, the goals that can be used are limited by the type of quality data maintained in the LQT 56.

It should be appreciated that the functional blocks illustrated in FIG. 2 do not have to be present in every node in the network 10. For example, link quality determination can be performed in a single node (or some number less than all) in the network 10 and then distributed to the other nodes. Also, path selection can be performed in less than all of the nodes by delivering appropriate requests to the implementing nodes. In a network following a centralized approach, link quality determination and/or path selection can be performed in a base station node for servicing the other nodes in the network. The base station node can include, for example, a satellite transceiver for accessing DTED data, among other things. Other functional distributions are also possible. In addition, information storage does not have to be provided in every node. That is, one or more selected nodes can store all of the required information and allow other nodes to access the information when needed.

Figure 3:
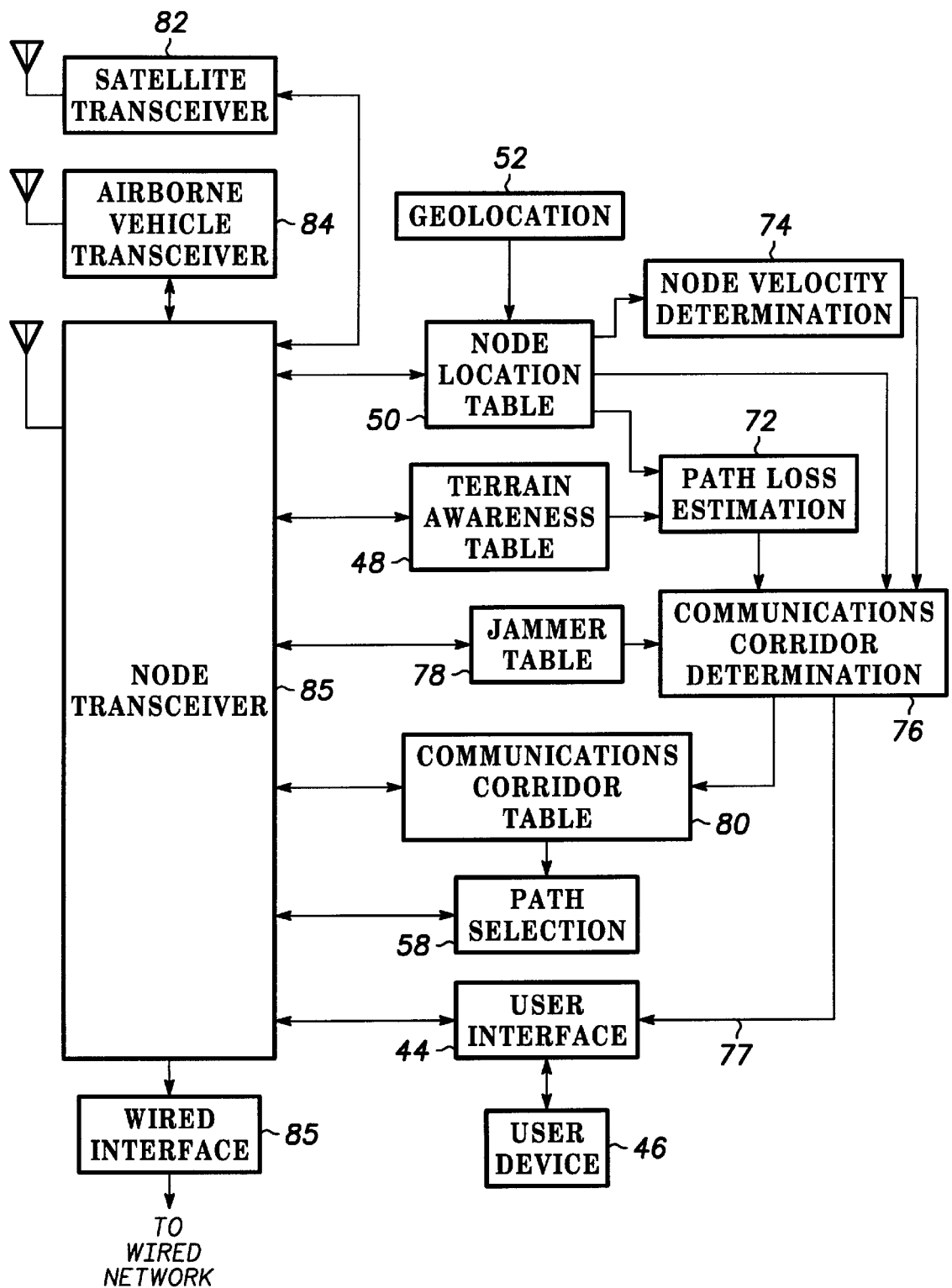
FIG. 3 is a block diagram illustrating a node in accordance with another embodiment of the present invention.

FIG. 3 is a block diagram illustrating a node 90 in accordance with another embodiment of the present invention. For convenience, the same reference numerals are used in FIG. 3 that were used in FIG. 2 to describe the same or similar functionality. As illustrated, the node 90 includes: a node transceiver 42, a user interface 44, a user device 46, a terrain awareness table 48, a node location table 50, a geolocation unit 52, a pathloss estimation unit 72, a node velocity determination unit 74, a communications corridor determination unit (CCDU) 76, a jammer table 78, a communications corridor table (CCT) 80, a path selection unit 58, a satellite transceiver 82, and an airborne vehicle transceiver 82. As will be described in greater detail, the node 90 is designed for use in military communications applications. However, many of the inventive features of the node 90 are also applicable to commercial networks.

Figure 4:
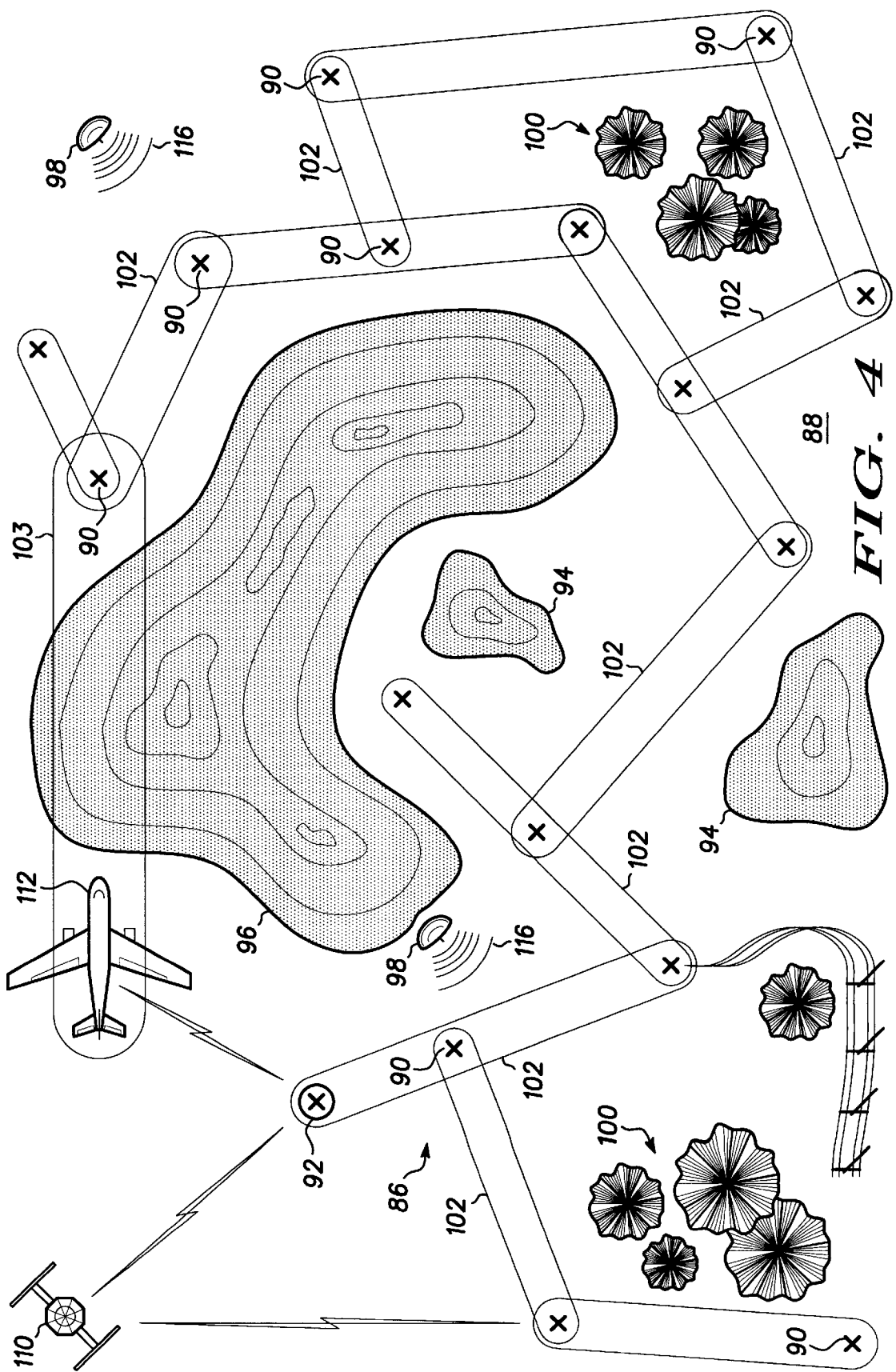
FIG. 4 is an aerial view of a battlefield implementation of the present invention.

FIG. 4 is an aerial view of a battlefield situation involving a military communications network 86. The node 90 of FIG. 3 will be described with reference to the scenario illustrated in FIG. 4. As illustrated in FIG. 4, a military communications network 86 is provided that includes a number of wireless communications nodes 90 distributed within a battlefield region 88. The individual nodes 90 are represented as X's in the figure. Some of the nodes 90 represent soldiers carrying, for example, Manpack communications equipment. Other nodes 90 can include vehicle mounted transceivers. Still other nodes 90 include less-mobile field units, such as command and control centers, having specially adapted computer units for providing communications functions. In addition, a hub node 92 can be provided that includes a satellite transceiver for communicating with, for example, the MILSTAR satellite system. Other types of nodes are also possible. The nodes 90 are interspersed at tactical positions about the battlefield region 88. As shown, the battlefield region 88 has an inconsistent terrain having hills 94 and a mountain 96. In addition, the battlefield terrain includes areas having dense forest 100. Further, various enemy jamming stations 98 are located within the battlefield region 88.

As can be appreciated, a battlefield situation, such as that illustrated in FIG. 4, requires, at a minimum, reliable connectivity between nodes 90. An interrupted or lost connection, for example, can lead to a loss of ground or, more tragically, a loss of lives. Typically, the nodes 90 will be in continuous motion throughout the battlefield region 88 (such as when the troops are advancing) thus providing a constantly changing network topology. The present invention provides a method and apparatus for providing enhanced network connection reliability by adapting path selection activity to the changing network topology using terrain information.

With reference back to FIG. 3, the node location table 50 and the terrain awareness table 48 operate essentially as before. The node 90, however, includes a satellite transceiver 82 for receiving DTED information from a satellite for storage in the terrain awareness table 48.

The pathloss estimation unit 72 receives the node location and terrain information from the node location table 50 and the terrain awareness table 48, respectively, and uses the information to estimate pathloss between node pairs in the network 86. The node velocity determination unit 74 also receives the node location information from the node location table 50 and uses it to determine velocity values for nodes in the network 86. The node velocity and pathloss information is delivered to the CCDU 76 which uses the information to define at least one communications corridor 102 in the network 86.

As illustrated in FIG. 4, the communications corridors 102 are each comprised of a subset of nodes 90 in the network 86. The communications corridors 102 represent preferred subpaths within the network 86 for use in establishing connections between remote nodes in the network 86. The communications corridors 102 are selected to include direct wireless links between nodes 90 that are believed to be reliable for at least the near future. In a preferred embodiment, each communications corridor 102 includes at least two nodes 90 that are capable of communicating with one another via a direct wireless link. If a communications corridor 102 includes more than two nodes 90, each of the nodes 90 is preferably capable of communicating with each of the other nodes 90 via a direct wireless link. In addition, all of the direct wireless links within a given communications corridor 102 preferably have a pathloss that is below a predetermined threshold value. In accordance with the present invention, the communications corridors 102 will be continuously updated based on changing node locations. Adjustments can also be made based on changing terrain conditions.

To further improve communications reliability, the CCDU 76 uses the velocity information from the node velocity determination unit 74 to predict the future position of nodes 90 in the network 86 for use in adaptively modifying the communications corridors 102. For example, if it is predicted that a first node 90 will be moving into an area that will degrade the link between it and a second node 90 in the same communications corridor 102, the first node 90 can be removed from the communications corridor 102 before the predicted position is actually reached by the first node. This will prevent any reliance on the affected communications corridor 102 to provide a connection in the network 86 using the first node 90. In one embodiment, the CCDU 76 includes alarm functionality for alerting a user of the node 90 of an impending loss of network link integrity based on the predicted future position of the node 90. If an alarm condition exists, the CCDU 76 delivers a signal to the user device 46 via alarm line 77 and user interface 44.

In addition to defining the communications corridors 102, the CCDU 76 can also include functionality for determining transmit parameters for use within communications corridors 102. For example, the CCDU 76 can determine a power level to be used within a particular communications corridor (or within a particular link in that corridor) based on an estimated pathloss in that corridor. The power level can be selected to minimize interference with other nodes 90 or to minimize detectability by the enemy. Other transmit parameters, such as modulation-type and center frequency, can also be determined by the CCDU 76 for each communications corridor based on the terrain information. These parameters can be chosen to enhance corridor connectivity in diverse terrain environments. Some modulation-type options can include frequency hopping spread spectrum, direct sequence spread spectrum, and adaptive rate modulation. The CCDU 76 can also include functionality for determining an anti-jamming countermeasure to be implemented within a particular communications corridor 102 in the network 86. This countermeasure would be selected based, in part, on information from the jammer table 78.

The jammer table 78 includes a memory for storing information relating to known jamming sources 98 in the battlefield region 88. Like the other storage units, the jammer table 78 can get its information from the network 86 (via, for example, a flooding operation) and can be periodically or continuously updated. In addition, jammer information can be entered into the network 86 by a user via, for example, a user device 46 in one of the nodes 90. Jammer information can also be received from a satellite 110 or airborne vehicle 112 above the battlefield region 88. In one embodiment of the invention, the CCDU 76 uses the jammer information from the jammer table 78 to define the communications corridors 102. For example, the CCDU 76 can avoid the formation of communications corridors 102 in areas known to be affected by jamming. If the jammer is known to operative at only certain times of day, the communications corridors 102 can be adjusted based thereon.

With reference to the network 86 of FIG. 4, it should be noted that the communications corridors 102 have been established to avoid transmissions through regions having known obstructions (such as transmissions over hills 94 or through forests 100). Communications corridors 102 have also been set up to avoid links through jammed regions 116. Once the communications corridors 102 have been defined, they are stored in the CCT 80. It should be appreciated that the CCDU 76 in a particular node 90 does not necessarily have to determine all of the communications corridors 102 that are stored in the associated CCT 80. That is, other nodes 90 may determine some of the communications corridors 102 and then distribute the results within the network 86. In one embodiment, a centralized node, such as hub node 92, determines all of the communications corridors 102 for the entire network 86 and distributes the results. In another embodiment, each node 90 determines its own communications corridor 102.

In one embodiment of the present invention, one or more of the nodes 90 in the network 86 are aboard an airborne vehicle 112. This airborne node can be used to provide an aerial corridor 103 over an obstruction in the terrain, such as, for example, mountain 96. The aerial corridor 103 can be used to circumvent the need to use a large number of ground-based nodes 90 to connect to a remote node. In addition, the aerial corridor 103 can serve as an emergency communications link to a remote area should none of the ground-based paths be available. The airborne vehicle 112 can also be used to provide a connection path to other wireless communications networks that are remote from the network 86. The airborne vehicle 112 can include any form of aircraft including airplanes, helicopters, blimps, unmanned air vehicles (UAVs), and others. Some or all of the ground based nodes 90 can include airborne vehicle transceivers 84 for use in providing a link to an airborne vehicle 112.

One or more of the nodes 90 can also include a satellite transceiver 82 for use in communicating with a satellite communications system. The satellite communications system can be used to provide a connection path between nodes 90 in the network 86 or can provide a link to other communications networks. For example, tactical commands can be delivered to the battlefield region 88 from a distant command center via a satellite link. In addition, one or more of the nodes 90 can also include a wired interface unit 85 for providing a connection to a distant entity (such as a remote network) via a hardwired connection, such as by wire, cable, optical fiber, or via power lines.

The path selection unit 58 is operative for selecting one or more communications corridors to provide a connection between remote nodes 90 in the network 86. As before, the path selection function can be centralized or distributed within the network 86. In general, a path will be selected for providing an optimal connection between two desired nodes. In a preferred embodiment, the optimal connection will be the path of least pathloss, although other criteria may also be appropriate. As shown in FIG. 4, each of the communications corridors 102 have at least one node 90 that is shared with another communications corridor 102. This shared node 90 is used for effecting communications between the two communications corridors 102. That is, all signals transmitted between the two corridors 102 will go through the shared node 90. Therefore, link use within a communications corridor will depend upon the next intended communications corridor in the selected path. Where possible, multiple hops will be used within communications corridors 102 to reduce delays.

It should be appreciated that the above description relates to specific embodiments of the present invention and is not intended to unduly limit the breadth of the invention. That is, various modifications can be made to the above-described structures without departing from the spirit and scope of the invention.

What is claimed is:

1. A communications network, comprising:
  a plurality of wireless communications nodes dispersed geographically within a first region, each of said plurality of said wireless communications nodes including a geolocation device configured to determine a current location;
  a node location table operative to store said current location of each of said plurality of wireless communications nodes;
  a terrain awareness table operative to store terrain information for said first region, said terrain information including elevation information of surface points within said first region;
  a path selection unit configured to select a substantially optimal communications path through said plurality of wireless communications nodes, said substantially optimal communications path selected by said path selection unit based at least in part on said terrain information and said current location of each of said plurality of wireless communication nodes.

2. The communications network, as claimed in claim 1, wherein said path selection unit is configured to estimate a pathloss between said plurality of wireless communications nodes based at least in part on said current location information and said terrain information.

3. The communications network, as claimed in claim 2, wherein said path selection unit includes a processor that is programmed to implement a Longley-Rice pathloss model that is modified to use terrain information in estimating said pathloss between said plurality of wireless communications nodes.

4. The communications network, as claimed in claim 2, said communications network further comprising:
  a node velocity communication unit configured to receive said current location of each of said plurality of wireless communications nodes stored in said node location table and use said current location of each of said plurality of wireless communications nodes to determine velocity values for said plurality of wireless communications nodes; and
  a communications corridor determination unit configured to define a plurality of communications corridors within said plurality of wireless communications nodes based on said velocity values and said path loss, each of said plurality of communications corridors including a subset of said plurality of wireless communications nodes and representing a preferred subpath for use in connecting nodes in said communications network.

5. The communications network, as claimed in claim 4, wherein:
  each communications corridor includes at least two wireless communications nodes, wherein each of said at least two wireless communications nodes can communicate with each other of said at least two wireless communications nodes via a direct wireless communications link, wherein each direct wireless communications link has a pathloss below a predetermined threshold value.

6. The communications network, as claimed in claim 4, wherein:
  each of said plurality of communications corridors includes at least one shared node that is shared with another of said plurality of communications corridors, wherein communications between communications corridors take place through shared nodes.

7. The communications network, as claimed in claim 4, wherein:
  said plurality of wireless communications nodes includes at least one mobile node; and
  said communications corridor determination unit includes means for adaptively changing said plurality of communications corridors based on movement of said at least one mobile node within said first region.

8. The communications network, as claimed in claim 7, wherein:
  said at least one mobile node includes an alarm for alerting a user of said at least one mobile node of an impending loss of network link integrity based on a predicted future position of said at least one mobile node.

9. The communications network, as claimed in claim 1, said communications network further comprising a wireless transceiver for receiving said terrain information from a satellite.

10. The communications network, as claimed in claim 1, said communications network further comprising a wireless transceiver for receiving said terrain information from an airborne platform.

11. The communications network, as claimed in claim 1, said communications network further comprising a wireless transceiver for receiving said terrain information from a ground based transmitter.

12. The communications network, as claimed in claim 1, wherein:
said terrain information includes digital terrain elevation data (DTED).

13. The communications network, as claimed in claim 1, wherein:
said terrain information includes at least one of the following: soil information, climate information, and foliage information.

14. The communications network, as claimed in claim 1, wherein:
said terrain information includes classification information for said first region.

15. The communications network, as claimed in claim 14, wherein:
said classification information includes at least one of the following designations: urban, desert, sea, jungle, forest, and mountain.

16. The communications network, as claimed in claim 1, wherein:
said plurality of wireless communications nodes includes at least one mobile node; and
said communications network further comprises means for calculating a velocity of said at least one mobile node, wherein said path selection unit uses said velocity of said at least one mobile node to determine said substantially optimal communications path.

17. The communications network, as claimed in claim 16, wherein:
said path selection unit includes means for predicting a future position of said at least one mobile node based on a current position of said at least one mobile node, said velocity of said at least one mobile node and said terrain information, wherein said path selection unit uses said future position to determine said substantially optimal communications path.

18. The communications network, as claimed in claim 1, wherein:
at least one of said plurality of wireless communications nodes includes means for tracking locations of other wireless communications nodes in the plurality of wireless communications nodes.

19. The communications network, as claimed in claim 1, wherein:
said terrain awareness table and said path selection unit are both located within one of said plurality of wireless communications nodes.

20. The communications network, as claimed in claim 1, wherein:
said plurality of wireless communications nodes are configured in a centralized architecture having at least one base station node.

21. The communications network, as claimed in claim 1, wherein:
said plurality of wireless communications nodes are configured in a distributed architecture without centralized control.

22. The communications network, as claimed in claim 1, wherein:
said plurality of wireless communications nodes includes at least one node within an airborne vehicle.

23. The communications network, as claimed in claim 22, wherein:
said airborne vehicle establishes a communications corridor to a second plurality of wireless communications nodes remote from said first plurality of wireless communications nodes.

24. The communications network, as claimed in claim 1, wherein:
said plurality of wireless communications nodes includes at least one wired terrestrial link to a third plurality of wireless communications nodes.

25. The communications network, as claimed in claim 1, said communications network further comprising a jammer table for tracking known jamming sources in said first region, wherein said path selection unit uses said jammer table to determine said substantially optimal communications path.

26. A wireless communications node for use in a communications network having a plurality of wireless communications nodes arranged within a first geographic region, at least some of said plurality of wireless communications nodes being mobile, said wireless communications node comprising:
a wireless transceiver for communicating with at least one other of the plurality of wireless communications nodes;
a geolocation device for determining a current location of said wireless communications node;
a terrain awareness table for use in collecting terrain information for said first geographic region, said terrain information including at least elevation information for surface points within said first geographic region;
a node location table for use in collecting current location information for nodes in said plurality of wireless communications nodes; and
a communications corridor determination unit (CCDU) for use in establishing at least one communications corridor within said first geographic region based on said terrain information and said current location information, said at least one communications corridor including a subset of the plurality of wireless communications nodes and representing a preferred subpath through the network for use in providing a communications connection between nodes in the network.

27. The wireless communications node, as claimed in claim 26, further comprising:
a pathloss estimation unit, coupled to said terrain awareness table and said node location table, for estimating pathloss information for selected node pairs in said plurality of wireless communications nodes based on said terrain information and said current location information, said CCDU using said pathloss information to establish said at least one communications corridor.

28. The wireless communications node, as claimed in claim 26, further comprising:

a communications corridor link table (CCLT) for tracking a plurality of communications corridors in the communications network; and a path selection unit, coupled to said CCLT, for selecting at least one of said plurality of communications corridors to provide an optimal communications connection between a first and second wireless communications node.

29. The wireless communications node, as claimed in claim 28, wherein:

said path selection unit selects a concatenation of successive communications corridors between said first wireless communications node and said second wireless communications node.

30. The wireless communications node, as claimed in claim 26, wherein:

said CCDU adaptively adjusts said at least one communications corridor based on changing node locations.

31. The wireless communications node, as claimed in claim 26, wherein:

said CCDU adaptively adjusts said at least one communications corridor based on changing terrain conditions.

32. The wireless communications node, as claimed in claim 6, wherein:

said CCDU includes means for selecting a modulation type to be used within said at least one communications corridor, wherein said modulation type is selected to enhance corridor connectivity in diverse terrain conditions.

33. The wireless communications node, as claimed in claim 32, wherein:

said modulation type is selected from a group including at least: frequency hopping modulation, direct sequence modulation, and adaptive rate modulation.

34. The wireless communications node, as claimed in claim 26, wherein:

said CCDU includes means for selecting an anti-jamming countermeasure to be used in said at least one communications corridor, wherein said anti-jamming countermeasure is selected to enhance corridor connectivity.

35. The wireless communications node, as claimed in claim 26, wherein:

said CCDU includes means for selecting a frequency range of operation to be used by said at least one communications corridor, wherein said frequency range of operation is selected to enhance corridor connectivity in diverse terrain conditions.

36. The wireless communications node, as claimed in claim 26, wherein:

said CCDU includes means for setting a signal power level in said at least one communications corridor, based on said pathloss information estimated by said pathloss estimation unit.

37. In a communications network having a plurality of wireless communications nodes arranged within a first geographic region, at least some of said plurality of wireless communications nodes being mobile, a method for determining an optimal communications path between a first wireless communications node and a second wireless communications node in said plurality of wireless communications nodes, said method comprising the steps of:

obtaining terrain information for said first geographic region, said terrain information including at least elevation information for surface points within said first geographic region;

acquiring location information for each of said plurality of wireless communications nodes;

calculating pathloss information for selected pairs of wireless communications nodes in said plurality of wireless communications nodes using said terrain information and said location information, said pathloss information relating to an expected attenuation for a signal propagating between first and second nodes in each selected pair;

defining a plurality of communications corridors in said first geographic region based on said pathloss information, wherein each of said plurality of communications corridors includes a subset of said plurality of wireless communications nodes; and selecting at least one of said plurality of communications corridors to provide the optimal communications path between the first wireless communications node and the second wireless communications node.

38. The method, as claimed in claim 37, wherein:

said step of selecting includes choosing a concatenation of successive communications corridors between the first wireless communications node and the second wireless communications node.

39. The method, as claimed in claim 37, wherein:

said step of defining includes finding a first communications corridor consisting of a first group of wireless communications nodes, wherein each node in said first group is capable of communicating with each other node in said first group via a direct wireless link having a pathloss less than a predetermined threshold value.

40. The method, as claimed in claim 37, wherein:

said step of defining is adaptive to changing terrain information and changing location information.

41. The method, as claimed in claim 37, wherein:

said step of obtaining includes receiving digital terrain elevation data (DTED) from a satellite.

* * * * *